United States Patent
Nozaki et al.

(10) Patent No.: US 6,248,821 B1
(45) Date of Patent: Jun. 19, 2001

(54) FLAME RETARDANT FOR MESH SHEETS AND FLAMEPROOF MESH SHEET COMPRISING THE SAME

(75) Inventors: Saiji Nozaki, Toyama; Kuniaki Kamiya, Osaka, both of (JP)

(73) Assignee: Kyowa Kabushiki Kaisha (JP)

( * ) Notice: Subject to any disclaimer, the term of this patent is extended or adjusted under 35 U.S.C. 154(b) by 0 days.

(21) Appl. No.: 09/329,303

(22) Filed: Jun. 10, 1999

(30) Foreign Application Priority Data

Jun. 11, 1998 (JP) .................................................. 10-199406
Apr. 2, 1999 (JP) .................................................. 11-130420

(51) Int. Cl.$^7$ ....................................................... C08K 3/10
(52) U.S. Cl. .......................... 524/416; 524/434; 524/436; 428/704
(58) Field of Search ................................... 524/416, 434, 524/436; 428/704

(56) References Cited

U.S. PATENT DOCUMENTS

| 4,762,750 | 8/1988 | Girgis et al. ........................... 428/378 |
| 4,762,751 | 8/1988 | Girgis et al. ........................... 428/378 |
| 4,877,823 | 10/1989 | Plachetta et al. ....................... 524/80 |
| 5,279,878 | 1/1994 | Fottinger et al. ....................... 428/102 |
| 5,286,576 | 2/1994 | Srail et al. ............................ 428/517 |
| 5,486,398 | 1/1996 | Weber et al. ........................... 428/95 |
| 5,496,881 | * 3/1996 | Annemaier et al. .................. 524/443 |
| 5,501,879 | 3/1996 | Murayama ............................ 427/381 |

FOREIGN PATENT DOCUMENTS

| 0 505 940 | 9/1992 | (EP) . |
| 0 546 841 | 6/1993 | (EP) . |
| 52-41786 | 10/1977 | (JP) . |
| 53-18065 | 6/1978 | (JP) . |
| 61-9430 | 3/1986 | (JP) . |
| 61-223045 | 10/1986 | (JP) . |

OTHER PUBLICATIONS

Japan Plastics; Feb. 1991; pp. 74–80.
Kroschwitz et al.; "Encyclopedia of Chemical Technology"; vol. 10, 4th Edition; 1993; p. 665.
Sekisui; "Fire Retard Polyolefin Composition Comprise Polyolefin Red Phosphorus Ammonium Phosphate"; Patent Abstracts of Japan; Oct. 3, 1986; Abstract.

* cited by examiner

Primary Examiner—Kriellion Sanders
(74) Attorney, Agent, or Firm—Rader, Fishman & Grauer

(57) ABSTRACT

A flame retardant suitable for use in mesh sheets comprising a polyolefin resin aqueous dispersion having a resin solid content of 25–75 wt %, 40 to 130 parts by weight of an ammonium polyphosphate compound based on 100 parts by weight of said polyolefin resin aqueous dispersion, and 60 to 150 parts by weight of a metal hydroxide based on 100 parts by weight of the solid content of said polyolefin resin aqueous dispersion.

14 Claims, No Drawings

FLAME RETARDANT FOR MESH SHEETS AND FLAMEPROOF MESH SHEET COMPRISING THE SAME

BACKGROUND OF THE INVENTION

1. Field of the Invention

The present invention relates to a halogen-free flameproof mesh sheet suitable for being used outdoors such as in a construction work site or engineering work site for a long time.

2. Description of Related Art

A tendency toward an increase in the number of buildings having a large number of stories has been seen recently in the construction industry. Meanwhile, there is also an increase in the number of houses having a small number of stories. It is generally obligatory to lay flameproof mesh sheets in the construction of houses having a small number of stories, as well as scattering prevention flameproof mesh sheets may also be required in these buildings for safety. Regulations regarding such flameproofing are becoming more and more strict.

Currently used flameproof mesh sheets and scattering prevention flameproof mesh sheets can be produced for example, by weaving gray yarn prepared by coating polyester, nylon or polypropylene multi-filament fibers with a vinyl chloride-based paste resin composition and heating. The obtained gray cloth is then subjected to further heating. Alternatively, such yarn can be prepared by coating gray cloth prepared by weaving multi-filament fibers with a vinyl chloride-based paste resin composition and heating, and processing the obtained gray cloth to a desired shape.

The resin composition for coating fibers and cloth comprises for example, a chlorine-containing vinyl chloride resin as the resin and a chlorine-based flame retardant such as chlorinated paraffin, a bromide-based flame retardant such as decabromodiphenyl oxide, or an inorganic flame retardant such as antimony trioxide as a flame retardant (see, for example, Examined Japanese Patent Publication Nos. 52-41786, 53-18065 and 61-9430, as well as Plastics, February, 1991 which are all incorporated herein by reference in their entireties).

In recent years, it has been globally demanded to avoid the use of resins and flame retardants containing elemental halogen which generates harmful gas at the time of combustion from the viewpoint of environmental preservation.

Japanese Laid-Open Patent Publication No. 61-223045 proposes kneading red phosphorus and ammonium phosphate into a polyolefin to prevent corrosion by halogen contained in a halogen-containing compound flame retardant. However, a flame retardant prepared by dispersing ammonium polyphosphate or a metal hydroxide into an aqueous dispersion of an ethylene-vinyl acetate copolymer, an ethylene-vinyl acetate-vinyl versatate copolymer or an ethylene-vinyl acetate-acrylic ester copolymer, or a dispersion consisting of the above dispersion and a polyurethane aqueous dispersion is not known.

The inventors of the present invention previously proposed a halogen-free flame retardant comprising an aqueous dispersion of a polyolefin resin in Japanese Patent Application No. 9-225464 (incorporated herein by reference in its entirety). Although this flame retardant provides an excellent effect, it has a tendency to increase in viscosity during storage over time.

The present inventors also previously proposed a halogen-free flame retardant containing an aqueous dispersion of an ethylene-vinyl acetate copolymer of 10 to 95 parts by weight of vinyl acetate and the balance consisting of ethylene in Japanese Patent Application No. 9-312550 (incorporated herein by reference in its entirety). Although this flame retardant provides excellent function and effect, a product thereof has a red tint because red phosphorus is used and it is difficult to color it opaque white or a light vivid color, even by adding titanium oxide or the like. The present invention improves the color and flame retardancy of the flame retardant of JP 9-312550. An opaque white or light vivid color flameproof mesh sheet has been desired in the application field of flameproof mesh sheets.

SUMMARY OF THE INVENTION

It is an object of the present invention, which has been made in view of the above situation, to provide a flame retardant for halogen-free flameproof mesh sheets which does not substantially experience an increase in viscosity during storage, can generally be colored any color, is generally lustrous and flexible, and does not generate harmful halogen gas at the time of combustion, as well as flameproof mesh sheet comprising the same.

In accordance with these and other objects, there is provided a flame retardant suitable for use in sheets comprising a polyolefin resin aqueous dispersion having a resin solid content of 25–75 wt %, 40 to 130 parts by weight of an ammonium polyphosphate compound based on 100 parts by weight of said polyolefin resin aqueous dispersion, and 60 to 150 parts by weight of a metal hydroxide based on 100 parts by weight of the solid content of said polyolefin resin aqueous dispersion.

Additional objects, features and advantages of the invention will be set forth in the description which follows, and in part will be obvious from the description, or may be learned by practice of the invention. The objects, features and advantages of the invention may be realized and obtained by means of the instrumentalities and combinations particularly pointed out in the appended claims.

DETAILED DESCRIPTION OF THE PREFERRED EMBODIMENT

The present invention relates to: a flame retardant for mesh sheets which comprises 40 to 130 parts by weight of an ammonium polyphosphate compound and 60 to 150 parts by weight of a metal hydroxide based on 100 parts by weight of the solid content of a polyolefin resin aqueous dispersion having a resin solid content of 25 to 75 wt %. Particularly, the polyolefin resin aqueous dispersion can be at least one selected from (i) an aqueous dispersion of an ethylene-vinyl acetate copolymer of 10 to 95 wt %, preferably 15 to 95 wt %, of vinyl acetate and the balance consisting of ethylene, having a resin solid content of 25 to 75 wt %, or preferably 30 to 75 wt %, (ii) an aqueous dispersion of an ethylene-vinyl acetate-vinyl versatate copolymer of 5 to 30 wt % of ethylene, 15 to 70 wt %, or preferably 30 to 70 wt %, of vinyl acetate and 25 to 75 wt %, or preferably 25 to 65 wt %, of vinyl versatate, having a resin solid content of 30 to 70 wt %, and (iii) an aqueous dispersion of an ethylene-vinyl acetate-acrylic ester copolymer of 5 to 30 wt % of ethylene, 10 to 75 wt %, or preferably 30 to 70 wt %, of vinyl acetate and 20 to 85 wt % of acrylic ester, having a resin solid content of 25 to 75 wt %, or preferably 40 to 70 wt %.

Any polyolefin resin aqueous dispersion can be used. An aqueous dispersion of an ethylene-vinyl acetate copolymer which is an olefin resin, an aqueous dispersion of an ethylene-vinyl acetate-vinyl versatate copolymer or an aqueous dispersion of an ethylene-vinyl acetate-acrylic ester copolymer are advantageous as a base material in the present invention. This is because such dispersions tend to fully impregnate multi-filament fibers and cloth with the flame retardant and uniformly coat them therewith. Aqueous dispersions that provide easy coating by impregnation are desirable for use in the present invention.

Suitable ethylene-vinyl acetate copolymers used in the present invention include, for example, a copolymer of 10 to 95 wt % of vinyl acetate and the balance consisting of ethylene. Suitable aqueous dispersions of the ethylene-vinyl acetate copolymer preferably have a solid content of 25 to 75 wt %, a particle diameter of 0.1 to 15 μm, a viscosity of 50 to 9,000 cp and a pH of 4 to 9, as exemplified for example, by V-200 and V-100 (of Mitsui Petrochemical Industries, Ltd.), and S-200, S-467, S-500, S-706, S-455, S-752 and S-753 (of Sumitomo Chemical Company, Ltd.).

Since an ethylene-vinyl acetate copolymer has a —OCO—$CH_3$ group and contains a substantial amount of oxygen, the flame retarding effect thereof is generally large when it is used in combination of ammonium polyphosphate. Suitable ethylene-vinylacetate-vinyl versatate copolymers useful in the present invention include, for example, a copolymer of 5 to 30 wt % of ethylene, 15 to 70 wt %, or preferably 30 to 70 wt %, of vinyl acetate and 25 to 75 wt %, or preferably 25 to 65 wt %, of vinyl versatate. The aqueous dispersion of the copolymer preferably has a solid content of 30 to 70 wt %, a particle diameter of 0.1 to 15 μm, a viscosity of 50 to 3,000 cp and a pH of 4 to 9, as exemplified by S-950 and S-951 (of Sumitomo Chemical Company, Ltd.).

Since ethylene-vinyl acetate-vinyl versatate copolymers also have a —OCO—$CH_3$ group and a barsatic acid group, $R_1R_2R_3C$—OCO—CH=$CH_2$, and also contains a substantial amount of oxygen, the flame retarding effect thereof is generally large when it is used in combination of ammonium polyphosphate.

Suitable ethylene-vinyl acetate-acrylic ester copolymers useful in the present invention include, for example, a copolymer of 5 to 30 wt % of ethylene, 10 to 75 wt %, or preferably 30 to 70 wt %, of vinyl acetate and 20 to 85 wt %, or preferably 25 to 65 wt % of acrylic ester. Useful aqueous dispersions of the ethylene-vinyl acetate-acrylic ester copolymer preferably have a solid content of 25 to 75 wt %, a particle diameter of 0.1 to 15 μm, a viscosity of 50 to 9,000 cp and a pH of 4 to 9, as exemplified, for example, by POLYSOL EF-421 and POLYSOL EF-221 (of Showa Kobunshi Co., Ltd.) and SUMIFLEX S-900, S-910 and S-920 (of Sumitomo Chemical Company, Ltd.).

Since ethylene-vinyl acetate-acrylic ester copolymers have a —OCO—$CH_3$ group and —COOH group and also contain a substantial amount of oxygen as well, the flame retarding effect thereof is generally large when it is used in combination of ammonium polyphosphate.

A polyurethane having the main structure of a polyester, polyether or polycarbonate can be used if desired as the polyurethane. A polyurethane having the main structure of a polyester is typically preferred from the viewpoints of flexibility, water resistance, adhesion and the like.

A polyurethane aqueous dispersion used in the present invention preferably has a solid content of 25 to 70 wt %, a particle diameter of 0.01 to 10 μm, a viscosity of 10 to 3,000 cp and a pH of 4 to 9, as exemplified, for example, by DESPACOL U-42 and DESPACOL KA8481 of Sumitomo Viel Urethane Co., Ltd., ADECABONTITER HUX-380, ADECABONTITER HUX-232, ADECABONTITER HUX-290H, ADECABONTITER HUX-350 and ADECABONTITER HUX-386H of Asahi Denka Kogyo K.K. and LETAN WB of Kansai Paint Co., Ltd.

Suitable ammonium polyphosphate compounds useful in the present invention include, for example, ammonium polyphosphate and amide polyphosphate. However, any compound having equivalent properties can also be used if desired. By using a microcapsulated ammonium polyphosphate compound, increases in the viscosity of the aqueous dispersion can generally be reduced when the ammonium polyphosphate compound is mixed into an olefin aqueous dispersion resin. Further, flameproof mesh sheets are often detached and washed to remove dirt after they have been laid at a construction site and been used for 4 to 8 months. Such sheets can be washed, for example, by immersing the sheet in hot water, and heating to about 40° C. with a detergent for several hours. The ammonium polyphosphate compound can be made relatively insoluble in water and can be stabilized by microcapsulation. The ammonium polyphosphate compound preferably has a phosphorus content of 15 to 35% and preferably has an average particle diameter of 5 to 40 μm.

The flame retardant of the present invention preferably contains 40 to 130 parts by weight of an ammonium polyphosphate compound based on 100 parts by weight of the total resin solid content. When the amount of the ammonium polyphosphate compound is smaller than 40 parts by weight or about 40 parts by weight, the flame retarding effect thereof may be small. When the amount is larger than 130 parts by weight or about 130 parts by weight, there may be almost no improvement of the flame retarding effect. Therefore, it is generally not desirable or necessary to add a large amount of the ammonium polyphosphate compound.

The flame retardant of the present invention can include, if desired, 3 to 30 parts by weight of an organic phosphoric ester based on 100 parts by weight of the total resin solid content. When the amount of the organic phosphoric ester is smaller than 3 parts by weight or about 3 parts by weight its effect of improving flame retardancy may be small and the improvement of luster and flexibility may be small. When the amount of organic phosphoric ester is larger than 30 parts by weight or about 30 parts by weight, the improvement of flame retardancy may be small and the final product may become sticky disadvantageously.

Suitable organic phosphoric esters include phosphoric esters containing no halogen and having an elemental phosphorus content of 7 to 18 wt % and a viscosity (20° C.) of 10 to 150 cp. Suitable organic phosphoric esters useful in the present invention include allyl phosphate-based compounds because they have a flame retarding effect, are compatible with a resin and have a plasticizing effect.

When an ammonium polyphosphate compound is used as a flame retardant in the present invention, the ammonium polyphosphate compound thermally decomposes at the time of combustion and generates nitrogen gas which shuts off oxygen. Other compounds that are capable of similar thermal decomposition can be used interchangeably. Ammonium polyphosphate compounds promote the carbonization of a polyolefin as a dehydration carbonization catalyst while generating nitrogen-containing gas, thereby improving the flame retarding effect. When a polyolefin and a resin such as polyurethane are used in combination, the blending ratios of these to the ammonium polyphosphate and the organic phosphoric ester disclosed herein are based on 100 parts by weight of the total resin solid content.

When a metal hydroxide is further blended, a larger flame retarding effect is obtained advantageously. Preferred examples of the metal hydroxide include magnesium hydroxide, aluminum hydroxide, red phosphorus and ammonium polyphosphate from the viewpoint of a multiplication effect. When a metal hydroxide is blended, the obtained product becomes hard, but by employing a phosphoric ester the product is softened, thus preventing the product from becoming too hard. The metal hydroxide must be existent in an amount of 60 to 150 parts by weight based on 100 parts by weight of the total resin solid content of the polyolefin resin dispersion or of the total resin solid content of the blend of polyolefin resin dispersion and polyurethane resin dispersion.

When the amount of the metal hydroxide is smaller than 60 parts by weight or about 60 parts by weight based on 100 parts by weight of the total resin solid content, its effect of promoting flame retardancy may be small. When the amount is larger than 150 parts by weight or about 150 parts by weight, the viscosity of the aqueous dispersion of the ethylene-vinyl acetate copolymer may rise disadvantageously.

As the aluminum hydroxide, for example, HIJILITE H-42M and HIJILITE H-43M (of Showa Denko K.K.) can be used.

As the magnesium hydroxide, for example, KISMER 5A (of Kyowa Kagaku Kogyo Co., Ltd.) can be used.

A description is subsequently given of a flameproof mesh sheet comprising the flame retardancy of the present invention.

The multi-filament fiber used in the present invention preferably comprises one or more multi-filament fibers selected from polyester, nylon, polypropylene, polyethylene and vinylon fibers. A polyester fiber is preferred in many instances from the viewpoints of strength and heat shrinkage.

The tensile strength of the multi-filament fiber is preferably adjusted to 4 to 10 g/denier inter alia to increase the strength and reduce the weight of a flameproof mesh sheet. The breaking extension thereof can be advantageously adjusted to 14 to 45% to increase the toughness of a flameproof mesh sheet and improve the drop impact energy absorption thereof.

The multi-filament fiber preferably has an equivalent single fineness of 3 to 17 denier, more preferably 3 to 12 denier, particularly preferably 4 to 9 denier and a total fineness preferably of 500 to 4,500 denier, more preferably 1,000 to 3,500 denier, particularly preferably 1,500 to 3,000 denier.

The multi-filament fiber used in cloth treated with a flame retardant after weaving preferably has an equivalent single fineness of 2 to 13 denier, more preferably 2 to 11 denier, particularly preferably 2.5 to 9 denier and a total fineness preferably of 150 to 2,500 denier, more preferably 200 to 2,000, particularly preferably 250 to 1,500 denier. The tensile strength of the multi-filament fiber can be controlled preferably to 4 to 10 g/denier to increase the strength and reduce the weight of a flameproof mesh sheet, and the breaking extension thereof can preferably be controlled to 14 to 45% to increase the toughness of a flameproof mesh sheet and to improve the drop impact energy absorption thereof.

A flameproof mesh sheet which must have high strength and high toughness can be prepared for example, by paralleling 2 to 4 multi-filament fibers and leno weaving or imitation gauging the fibers with a loom as well known in the art. In the case of a scattering prevention flameproof mesh sheet, cloth is often made by plain weaving a single multi-filament fiber with a loom by known technique. In the case of a flameproof mesh sheet for houses having a small number of stories, cloth is often made by plain weaving or leno weaving 2 to 4 multi-filament fibers by commonly known methods. The mesh length can be preferably 10 to 140 warps/10 cm and 10 to 140 wefts/10 cm.

As for suitable weight ratios of the solid content of the flame retardant to the multi-filament fiber and cloth, the solid content of the flame retardant can be, for example, 60 to 500 parts by weight based on 100 parts by weight of the multi-filament fiber and cloth. When the solid content of the flame retardant is smaller than 60 parts by weight or about 60 parts by weight based on 100 parts by weight of the multi-filament fiber or cloth, coating nonuniformity may occur and part of the texture of the multi-filament fiber and cloth may become exposed, thereby potentially deteriorating appearance and possibly reducing weatherability. Flameproofness may also deteriorate. When the solid content is larger than 500 parts by weight or about 500 parts by weight, the obtained flameproof mesh sheet may become heavy, thereby possibly deteriorating handling properties disadvantageously.

In some embodiments, the flame retardant is prepared in the substantial absence of water. In some embodiments, the flame retardant is prepared without the addition of water.

In the present invention, the types and amounts of one or more of a pigment, dye, plasticizer, ultraviolet absorber, optical stabilizer, antioxidant, stabilizer, coupling agent, defoaming agent, dispersant, diluent, thickener, foaming agent, mildewproofing agent and the like can be suitably selected and can be used in any combination if desired in conjunction with the flame retardant.

A description is subsequently given of a process for producing the flameproof mesh sheet of the present invention. However, any suitable process can be used and is possible in accordance with the present invention. When the flameproof mesh sheet of the present invention is produced using multi-filament fibers, the fibers can be coated with a flame retardant through a sizing nozzle, and the heated and gelled coated yarn can be taken up by a winder. The coated yarn taken up by the winder can be woven by a loom. The obtained fabric can be introduced into a heating furnace and heated to obtain gray cloth.

The gray cloth can be cut to a predetermined size, sewed and subjected to fix eyelets to obtain a halogen-free flameproof mesh sheet.

When the flameproof mesh sheet of the present invention is produced using cloth, multi-filament fibers can be woven with a dobby loom to obtain gray cloth. After the gray cloth is immersed in a tank filled with a flame retardant for mesh sheets and passed through the tank, it can be dried with blow-air and introduced into a heating furnace to carry out heat gelation to obtain coated gray cloth. To increase the amount of the flame retardant coated on the cloth, the cloth can be immersed in and passed through the tank filled with the flame retardant at least two times to produce coated gray cloth. The cloth can be cut to a predetermined size, sewed and subjected to fix eyelets to obtain a halogen-free flameproof mesh sheet.

EXAMPLES

The following nonlimiting examples are given to further illustrate the present invention.

Example 1

200 parts by weight of the S-753 ethylene-vinyl acetate copolymer aqueous dispersion (of Sumitomo Chemical Company, Ltd., a solid content of 50 wt %) was charged into a planetary mixer (volume of 25 liters), and then 80 parts by weight of the FOSTAPHRAM AP-462 ammonium polyphosphate (of Hoechst Co., Ltd.), 120 parts by weight of the HIJILITE H-42M aluminum hydroxide (of Showa Denko K.K.), 0.8 part by weight of the TINUBIN 327 ultraviolet absorber (of Ciba Geigy Co., Ltd.), 0.8 part by weight of the IRGANOX 1010 antioxidant (of Ciba Geigy Co., Ltd.), 1.0 part by weight of the HALS optical stabilizer (of Ciba Geigy Co., Ltd.), 2 parts by weight of the TIPAQUE C-97 titanium oxide (of Ishihara Sangyo Co., Ltd.) and 30 parts by weight of water were added little by little to the mixer under agitation over about 5 minutes. Agitation was further continued for 20 minutes. The pressure was gradually reduced to 5 mmHg and vacuum defoaming was carried out for about 30 minutes to give a flame retardant for mesh sheets having a viscosity of 2,520 cp (BM type viscometer, rotor V-6, 12 rpm, 25° C.). The flame retardant was placed in a bath, polyester multi-filament fibers having a total fmeness of 1,750 denier, each consisting of 384 filaments with an equivalent single fineness of 4.5 denier, a tensile strength of 8.5 g/denier and a breaking extension of 21%, were passed through a guide, pinched with a pinch roll, passed through a guide roll, the bath of the flame retardant and a sizing nozzle (of 0.7 mm in diameter) to coat the multi-filament fibers, and the obtained strand was heated at 150° C. in a heating furnace and passed through a another sizing nozzle (of 0.8 mm in diameter) to coat the strand, and then heated at 180° C. in a heating furnace to produce coated yarn of 3,980 denier. The weight ratio of the flame retardant for mesh sheets to the multi-filament fibers of the coated yarn was 130/100.

Plain weave cloth having a mesh length of 52 warps/10 cm and 52 wefts/10 cm was woven of the coated yarn with a rapier loom at a speed of 50 cm/mm. Thereafter, this cloth was heated at 160° C. by passing through a heating furnace to thermally fuse intersections between warps and wefts to obtain the flameproof mesh sheet of the present invention. The gray cloth was cut to a width of 190 cm and a length of 520 cm, sewed with a sewing machine and subjected to fix eyelets to obtain a 180 cm wide, 510 cm long flameproof mesh sheet.

The composition of the flame retardant is shown in Table 1 and the measurement results of the performance of a flameproof mesh sheet treated with the flame retardant are shown in Table 3.

Example 2

182 parts by weight of the S-951 ethylene-vinyl acetate-vinyl versatate copolymer (of Sumitomo Chemical Company, Ltd., a solid content of 55 wt %) was used in place of the S-753 ethylene-vinyl acetate copolymer. The TIPAQUE C-97 titanium oxide was not added. A flame retardant having a viscosity of 2,640 cp was obtained in the same manner as in Example 1 except above.

Multi-filament fibers having a total fineness of 3,000 denier, each consisting of 384 filaments with an equivalent single fineness of 7.8 denier, were passed through a sizing nozzle of 0.8 mm in diameter, gelled by heating, passed through a sizing nozzle of 0.9 mm in diameter and gelled by heating to obtain coated yarn of 5,815 denier.

A flameproof mesh sheet was obtained in the same manner as in Example 1 except that the coated yarn was processed into 30 warps/10 cm and 30 wefts/10 cm.

The composition of the flame retardant is shown in Table 1 and the measurement results of the performance of a flameproof mesh sheet treated with the flame retardant are show in Table 3.

Example 3

182 parts by weight of the S-910 ethylene-vinyl acetate-acrylic ester copolymer (of Sumitomo Chemical Company, Ltd., a solid content of 55 wt %) was used in place of the S-753 ethylene-vinyl acetate copolymer. 55 parts by weight of the TERRAJU-60 ammonium polyphosphate (of Chisso Corporation), 15 parts by weight of the TCP organic phosphoric ester and 140 parts by weight of the KISMER 5A magnesium hydroxide (of Kyowa Kagaku Co., Ltd.) were used. Further, 8 parts by weight of the TIPAQUE C-97 titanium oxide was added. A flame retardant having a viscosity of 2,980 cp was obtained in the same manner as in Example 1 except above.

Coated yarn of 8,852 denier was obtained using this flame retardant, the same multi-filament fibers as in Example 1, a sizing nozzle of 0.8 mm in diameter for the first coating and a sizing nozzle of 1.0 mm in diameter for the second coating.

A flameproof mesh sheet was obtained in the same manner as in Example 1 except above.

A flameproof mesh sheet was obtained in the same manner as in Example 1 except that this flame retardant was used. The composition of the flame retardant is shown in Table 1 and the measurement results of the performance of the flameproof mesh sheet treated with the flame retardant are shown in Table 3.

Example 4

80 parts by weight of the S-752 ethylene-vinyl acetate copolymer (of Sumitomo Chemical Company, Ltd., a solid content of 50 wt %), 55 parts by weight of the S-951 ethylene-vinyl acetate-vinyl versatate copolymer (of Sumitomo Chemical Company, Ltd., a solid content of 55 wt %), and 55 parts by weight of the S-910 ethylene-vinyl acetate-acrylic ester copolymer (of Sumitomo Chemical Company, Ltd., a solid content of 55 wt %) were used. A flameproof mesh sheet was obtained in the same manner as in Example 1 except above.

The composition of the flame retardant is shown in Table 1 and the measurement results of the performance of the flameproof mesh sheet treated with the flame retardant are shown in Table 3.

Example 5

55 parts by weight of the S-500 (of Sumitomo Chemical Company, Ltd., a solid content of 55 wt %) and 60 parts by weight of the S-752 (of Sumitomo Chemical Company, Ltd., a solid content of 50 wt %) in place of the S-753 ethylene-vinyl acetate copolymer, 105 parts by weight of the ADE-CABONTITER HUX-380 polyurethane (of Asahi Denka Kogyo Co., Ltd., the main structure of a polyester, a solid content of 38 wt %), 60 parts by weight of the TERRAJU-60 ammonium polyphosphate (of Chisso Corporation), 5 parts by weight of the TOP organic phosphoric ester (of Daihachi Kagaku Co., Ltd.), and 100 parts by weight of the HIJILITE H-42M aluminum hydroxide (of Showa Denko K.K.) were used. Water was not further added. A flameproof mesh sheet was obtained in the same manner as in Example 1 except above.

Multi-filament fibers of 1,500 denier were coated only once using a sizing nozzle of 0.7 mm in diameter. Coated yarn of 3,327 denier was obtained in the same manner as in Example 1 except above. A flameproof mesh sheet was obtained in the same manner as in Example 1 except that the coated yarn was processed into 25 warps/10 cm and 25 wefts/10 cm.

The composition of the flame retardant is shown in Table 1 and the measurement results of the performance of the flameproof mesh sheet treated with the flame retardant are shown in Table 3.

Example 6

145 parts by weight of the S-951 ethylene-vinyl acetate-vinyl versatate copolymer (of Sumitomo Chemical Company, Ltd., a solid content of 55 wt %) in place of the S-753 ethylene-vinyl acetate copolymer (of Sumitomo Chemical Company, Ltd., a solid content of 50 wt %), 53 parts by weight of the ADECABONTITER HUX-380 polyurethane (of Asahi Denka Kogyo Co., Ltd., the main structure of a polyester, a solid content of 38 wt %), 60 parts by weight of the TERRAJU-60 ammonium polyphosphate (of Chisso Corporation) and 120 parts by weight of the Hijilite H-42M aluminum hydroxide (of Showa Denko K.K.) were added. Water was not further added. A flame retardant for mesh sheets having a viscosity of 2,820 cp was obtained in the same manner as in Example 1 except above. A flame retardant for mesh sheets was obtained in the same manner as in Example 1 except that the flame retardant was used. The composition of the flame retardant is shown in Table 2 and the measurement results of the performance of the flameproof mesh sheet treated with the flame retardant are shown in Table 4.

Example 6

91 parts by weight of the S-910 ethylene-vinyl acetate-acrylic ester copolymer (of Sumitomo Chemical Company, Ltd., a solid content of 55 wt %) in place of the S-753 ethylene-vinyl acetate copolymer (of Sumitomo Chemical Company, Ltd., a solid content of 50 wt %), 132 parts by weight of the Letan WB polyurethane (of Kansai Paint Co., Ltd., the main structure of a polyester, a solid content of 38 wt %) and 60 parts by weight of the TERRAJU-60 ammonium polyphosphate (of Chisso Corporation) were used. Water was not further added. A flame retardant for mesh sheets having a viscosity of 1,950 cp was obtained in the same manner as in Example 1 except above. A flameproof mesh sheet was obtained in the same manner as in Example 1 except above. The composition of the flame retardant is shown in Table 2 and the measurement results of the performance of the flameproof mesh sheet treated with the flame retardant are shown in Table 4.

Example 6

91 parts by weight of the S-500 ethylene-vinyl acetate copolymer (of Sumitomo Chemical Company, Ltd., a solid content of 50 wt %) and 100 parts by weight of the S-752 ethylene-vinyl acetate copolymer (of Sumitomo Chemical Company, Ltd., a solid content of 50 wt %) were used in place of the S-753 ethylene-vinyl acetate copolymer (of Sumitomo Chemical Company, Ltd., a solid content of 50 wt %). 60 parts by weight of water was added. A flame retardant for mesh sheets having a viscosity of 1,820 cp was obtained in the same manner as in Example 1 except above. The composition of the flame retardant is shown in Table 2.

Imitation gauze cloth having a mesh length of 45 warps/10 cm and 45 wefts/10 cm was woven with a dobby loom using the flame retardant for mesh sheets and without using the coated multi-filament fibers in Example 1 by paralleling 3 multi-filament fibers of 750 denier to coat the cloth. The weight of the cloth was 225 gm².

The cloth was passed through a guide roll and a roll coater filled with the flame retardant, squeezed with a squeezing roll, dried with an air blow to remove the flame retardant filling the meshes of the cloth, and gelled in a heating furnace at 130° C., 160° C. and 180° C. The coated gray cloth was taken up by a winder. The weight of the coated gray cloth was 482 g/m² (mesh sheet gray cloth). The gray cloth was cut to a predetermined size, sewed and subjected to fix eyelets to obtain a flameproof mesh sheet. The performance of the mesh sheet is shown in Table 4.

Example 9

Plain weave cloth having a mesh length of 120 warps/10 cm and 120 wefts/10 cm was woven of multi-filament fibers of 250 denier with a loom without coating the multi-filament fibers as in Example 8. The weight of the cloth was 66 g/m².

The cloth was coated with the same flame retardant for mesh sheets as in Example 8 in the same manner as in Example 8 and gelled by heating, and the coated gray cloth having a weight of 134 g/m² was taken up by a winder.

The gray cloth was cut to a predetermined size, sewed and subjected to fix eyelets to obtain a flameproof mesh sheet for houses having a small number of stories.

The composition of the flame retardant used is shown in Table 2 and the measurement results of the performance of the flameproof mesh sheet for houses having a small number of stories treated with the flame retardant are shown in Table 4.

Example 10

145 parts by weight of the S-500 ethylene-vinyl acetate copolymer (of Sumitomo Chemical Company, Ltd., a solid content of 55 wt %) in place of the S-753 ethylene-vinyl acetate copolymer (of Sumitomo Chemical Company, Ltd., a solid content of 50 wt %) and 53 parts by weight of the LETAN WB polyurethane (of Kansai Paint Co., Ltd., a solid content of 38 wt %) were used. A flame retardant for mesh sheets having a viscosity of 1,960 cp was obtained in the same manner as in Example 1 except above. The composition of the flame retardant is shown in Table 2.

The same cloth as in Example 9 was coated with the flame retardant for mesh sheets in the same manner as in Example 9, and the obtained coated gray cloth having a weight of 155 g/m² was taken up by a winder.

The gray cloth was cut to a predetermined size, sewed and subjected to fix eyelets to obtain a flameproof mesh sheet for houses having a small number of stories.

The measurement results of the performance of the flameproof mesh sheet for houses having a small number of stories are shown in Table 4.

Comparative Example 1

The amount of the AP-462 FOSTAPHRAM ammonium polyphosphate (of Client Japan Co., Ltd.) used in Example 1 was changed to 30 parts by weight. A flame retardant having a viscosity of 2,310 cp was obtained in the same manner as in Example 1 except above. A flameproof mesh sheet was produced using the flame retardant in the same manner as in Example 1.

The composition of the flame retardant is shown in Table 5 and the measurement results of the performance of the flameproof mesh sheet treated with the flame retardant are shown in Table 7.

Comparative Example 2

The amount of the AP-462 FOSTAPHRAM ammonium polyphosphate (of Client Japan Co., Ltd.) used in Example 1 was changed to 150 parts by weight. A flame retardant having a viscosity of 2,880 cp was obtained in the same manner as in Example 1 except above. A flameproof mesh sheet was produced using the flame retardant in the same manner as in Example 1.

The composition of the flame retardant is shown in Table 5 and the measurement results of the performance of the flameproof mesh sheet treated with the flame retardant are shown in Table 7.

Comparative Example 3

The amount of the KISMER-5 magnesium hydroxide (of Kyowa Kagaku Kogyo Co., Ltd.) used in Example 3 was changed to 50 parts by weight. A flame retardant having a viscosity of 2,360 cp was obtained in the same manner as in Example 3 except above. A flameproof mesh sheet was produced using the flame retardant in the same manner as in Example 3.

The composition of the flame retardant is shown in Table 5 and the measurement results of the performance of the flameproof mesh sheet treated with the flame retardant are shown in Table 7.

Comparative Example 4

The amount of the HIJILITE H-42H aluminum hydroxide (of Showa Denko K.K.) used in Example 6 was changed to 170 parts by weight. A flame retardant having a viscosity of 3,270 cp was obtained in the same manner as in Example 6 except above. A flameproof mesh sheet was produced using the flame retardant in the same manner as in Example 6.

The composition of the flame retardant is shown in Table 5 and the measurement results of the performance of the flameproof mesh sheet treated with the flame retardant are shown in Table 7.

Comparative Example 5

A sizing nozzle of 0.6 mm in diameter was used in place of the sizing nozzle of 0.7 mm in diameter used in Example 1 to coat multi-filament fibers to obtain coated yarn of 2,710 denier. A flameproof mesh sheet was produced in the same manner as in Example 1 except that the yarn was not coated with a flame retardant twice unlike Example 1 and the coated yarn was used.

The composition of the flame retardant is shown in Table 5 and the measurement results of the performance of the flameproof mesh sheet treated with the flame retardant are shown in Table 7.

Comparative Example 6

8 parts by weight of the NOVA RED 120 red phosphorus (of Rin Kagaku Co., Ltd.) was added in Example 1. A flame retardant having a viscosity of 2,590 cp was obtained in the same manner as in Example 1 except above. A flameproof mesh sheet was produced using the flame retardant in the same manner as in Example 1.

The composition of the flame retardant is shown in Table 6 and the measurement results of the performance of the flameproof mesh sheet treated with the flame retardant are shown in Table 8.

Comparative Example 7

The amount of water added in Example 8 was changed to 120 parts by weight. A flame retardant aqueous dispersion having a viscosity of 470 cp was obtained in the same manner as in Example 8 except above.

A flameproof mesh sheet having a weight of 346 g/m was produced by coating and heating in the same manner as in Example 8 except that the flame retardant aqueous dispersion was used and the same cloth as in Example 8 was used.

The composition of the flame retardant is shown in Table 6 and the measurement results of the performance of the flameproof mesh sheet treated with the flame retardant are shown in Table 8.

TABLE 1

|  | solid content % | Example 1 | Example 2 | Example 3 | Example 4 | Example 5 |
|---|---|---|---|---|---|---|
| aqueous dispersion resin |  |  |  |  |  |  |
| ethylene-vinyl acetate copolymer |  |  |  |  |  |  |
| S-753 | 50 | 200 |  |  |  |  |
| S-500 | 55 |  |  |  |  | 55 |
| S-752 | 50 |  |  |  | 80 | 60 |
| ethylene-vinyl acetate-vinyl versatate copolymer S-951 | 55 |  | 182 |  | 55 |  |
| ethylene-vinyl acetate-acrylic ester copolymer S-910 | 55 |  |  | 182 | 55 |  |
| polyurethane |  |  |  |  |  |  |
| Adecabontiter HUX-380 | 38 |  |  |  |  | 105 |
| Letan WB | 38 |  |  |  |  |  |
| aqueous dispersion resin solid content (parts by weight) |  | 100 | 100 | 100 | 100 | 100 |
| ammonium polyphosphate A |  | 80 | 120 |  | 80 |  |
| ammonium polyphosphate B |  |  |  | 55 |  | 60 |
| phosphoric ester TCP |  |  |  | 15 |  |  |
| phosphoric ester CDP |  |  |  |  |  | 5 |
| aluminum hydroxide C |  | 120 | 80 |  | 120 | 100 |
| magnesium hydroxide D |  |  |  | 140 |  |  |
| titanium oxide C-97 |  | 2 | 0 | 8 | 2 | 2 |
| water (balance) |  | 30 | 30 | 30 | 30 | 0 |
| viscosity of flame retarded aqueous dispersion (CP) |  | 2520 | 2640 | 2980 | 2260 | 2970 |

TABLE 2

|  | Example 6 | Example 7 | Example 8 | Example 9 | Example 10 |
|---|---|---|---|---|---|
| aqueous dispersion resin |  |  |  |  |  |
| ethylene-vinyl acetate copolymer |  |  |  |  |  |
| S-753 |  |  |  |  |  |
| S-500 |  |  | 91 | 91 | 145 |
| S-752 |  |  | 100 | 100 |  |
| ethylene-vinyl acetate-vinyl versatate copolymer S-951 | 145 |  |  |  |  |
| ethylene-vinyl acetate-acrylic ester copolymer S-910 |  | 91 |  |  |  |
| polyurethane |  |  |  |  |  |
| Adecabontiter HUX-380 | 53 |  |  |  |  |
| Letan WB |  | 132 |  |  | 53 |
| aqueous dispersion resin solid content (parts by weight) | 100 | 100 | 100 | 100 | 100 |
| ammonium polyphosphate A |  |  | 80 | 80 | 80 |
| ammonium polyphosphate B | 60 | 60 |  |  |  |
| phosphoric ester TCP |  |  |  |  |  |
| phosphoric ester CDP |  |  |  |  |  |
| aluminum hydroxide C | 120 |  | 120 | 120 | 120 |
| magnesium hydroxide D |  | 100 |  |  |  |
| titanium oxide C-97 | 2 | 2 | 2 | 2 | 2 |
| water (balance) | 0 | 0 | 60 | 60 | 30 |
| viscosity of flame retarded aqueous dispersion (CP) | 2820 | 1950 | 1820 | 1820 | 1960 |

TABLE 3

|  |  | solid content % | Example 1 | Example 2 | Example 3 | Example 4 | Example 5 |
|---|---|---|---|---|---|---|---|
| fineness (De) of multi-filament fibers |  |  | 1750 | 3000 | 1750 | 1750 | 1500 |
| cloth | number of warps/10 cm |  | 52 | 30 | 52 | 52 | 25 |
|  | number of wefts/10 cm |  | 52 | 30 | 52 | 52 | 25 |
| weight of cloth (g/m²) |  |  |  |  |  |  |  |
| weight of coated cloth (g/m²) |  |  |  |  |  |  |  |
| fineness (De) of coated yarn |  |  | 4031 | 5815 | 8852 | 3762 | 3327 |
| flame retardant for mesh sheets/ multi-filament fiber or cloth |  |  | 130/ 100 | 94/ 100 | 406/ 100 | 115/ 100 | 122/ 100 |
| combustion test | testing method |  | A-2 | A-2 | A-2 | A-2 | A-1 |
| 1) | 2 minutes or 1 minute of heating |  |  |  |  |  |  |
|  | carbonization area (cm²) |  | 6 | 9 | 5 | 8 | 7 |
|  | afterflame time (seconds) |  | 0 | 0 | 0 | 0 | 0 |
|  | afterglow time (seconds) |  | 0 | 0 | 0 | 0 | 0 |
| 2) | 6 seconds or 3 seconds after inflammation |  |  |  |  |  |  |
|  | carbonization area (cm²) |  | 4 | 8 | 4 | 5 | 4 |
|  | afterflame time (seconds) |  | 0 | 1 | 0 | 1 | 0 |
|  | afterglow time (seconds) |  | 0 | 2 | 0 | 1 | 0 |
| 3) | number of times of flame contact |  | 5 | 4 | 5 | 4 | 5 |
| color difference | whiteness DE |  | 7.80 | 8.1 | 4.51 | 7.72 | 7.53 |
|  | brightness DL |  | −6.92 | −6.45 | −3.86 | −6.78 | −6.72 |
| generation of halogen gas (mg/g) |  |  | 0 | 0 | 0 | 0 | 0 |
| flexibility |  |  | ◉ | ◉ | ◉ | ◉ | ◉ |
| tensile strength warp/weft (Kg/3 cm) |  |  | 215/214 | 226/223 | 216/213 | 214/214 | 107/105 |
| tensile elongation warp/weft (Kg/3 cm) |  |  | 24/24 | 23/25 | 23/24 | 24/24 | 22/22 |
| toughness warp/weft (Kg/mm) |  |  | 10320/ 10272 | 10396/ 11150 | 9936/ 10224 | 10272/ 10272 | 4708/ 4620 |
| drop impact strength (penetration test) m |  |  | 7 | 8 | 7 | 7 | 4 |

TABLE 4

|  |  | Example 6 | Example 7 | Example 8 | Example 9 | Example 10 |
|---|---|---|---|---|---|---|
| fineness (De) of multi-filament fibers |  | 1750 | 1750 |  |  |  |
| cloth | number of warps/10 cm | 52 | 52 | 45 | 120 | 120 |
|  | number of wefts/10 cm | 52 | 52 | 45 | 120 | 120 |
| weight of cloth (g/m$^2$) |  |  |  | 225 | 66 | 66 |
| weight of coated cloth (g/m$^2$) |  |  |  | 482 | 134 | 155 |
| fineness (De) of coated yarn |  | 3920 | 3280 |  |  |  |
| flame retardant for mesh sheets/ |  | 124/ | 87/ | 115/ | 103/ | 135/ |
| multi-filament fiber or cloth |  | 100 | 100 | 100 | 100 | 100 |
| combustion test 1) | testing method | A-2 | A-1 | A-2 | A-1 | A-1 |
|  | 2 minutes or 1 minute of heating |  |  |  |  |  |
|  | carbonization area (cm$^2$) | 9 | 7 | 8 | 9 | 6 |
|  | afterflame time (seconds) | 0 | 0 | 0 | 0 | 0 |
|  | afterglow time (seconds) | 0 | 0 | 0 | 0 | 0 |
| 2) | 6 seconds or 3 seconds after inflammation |  |  |  |  |  |
|  | carbonization area (cm$^2$) | 8 | 7 | 8 | 7 | 5 |
|  | afterflame time (seconds) | 1 | 1 | 1 | 1 | 0 |
|  | afterglow time (seconds) | 1 | 1 | 1 | 1 | 0 |
| 3) | number of times of flame contact | 5 | 4 | 5 | 4 | 5 |
| color difference | whiteness DE | 7.68 | 7.42 | 7.84 | 7.96 | 8.02 |
|  | brightness DL | −6.77 | −6.53 | −6.87 | −6.64 | −6.72 |
| generation of halogen gas (mg/g) |  | 0 | 0 | 0 | 0 | 0 |
| flexibility |  | ◎ | ◎ | ◎ | ◎ | ◎ |
| tensile strength warp/weft (Kg/3 cm) |  | 212/213 | 216/217 | 215/214 | 73/72 | 71/70 |
| tensile elongation warp/weft (Kg/3 cm) |  | 23/22 | 22/22 | 24/24 | 24/26 | 24/24 |
| toughness warp/weft (Kg/mm) |  | 9752/9372 | 9504/9548 | 10320/10272 | 3504/3744 | 3408/3360 |
| drop impact strength (penetration test) m |  | 6 | 6 | 6 | 3 | 3 |

TABLE 5

|  | solid content % | Comparative Example 1 | Comparative Example 2 | Comparative Example 3 |
|---|---|---|---|---|
| aqueous dispersion resin |  |  |  |  |
| ethylene-vinyl acetate copolymer |  |  |  |  |
| S-753 | 50 | 200 | 200 |  |
| S-500 | 50 |  |  |  |
| S-752 | 55 |  |  |  |
| ethylene-vinyl acetate-vinyl versatate copolymer S-951 | 55 |  |  |  |
| ethylene-vinyl acetate-acrylic ester copolymer S-910 |  |  |  | 182 |
| polyurethane |  |  |  |  |
| Adecabontiter HUX-380 | 38 |  |  |  |
| Letan WB | 38 |  |  |  |
| aqueous dispersion resin solid content (parts by weight) |  | 100 | 100 | 100 |
| red phosphorus Nova Red-120 |  |  |  |  |
| ammonium polyphosphate A |  | 30 | 150 | 55 |
| ammonium polyphosphate B |  |  |  |  |
| phosphoric ester TCP |  |  |  | 15 |
| phosphoric ester CDP |  |  |  |  |
| aluminum hydroxide C |  | 120 | 120 |  |
| magnesium hydroxide D |  |  |  | 50 |
| titanium oxide C-97 |  | 2 | 2 | 8 |
| water (balance) |  | 30 | 30 | 30 |
| viscosity of flame retarded aqueous dispersion (CP) |  | 2310 | 2880 | 2360 |

TABLE 6

|  | Comparative Example 4 | Comparative Example 5 | Comparative Example 6 | Comparative Example 7 |
|---|---|---|---|---|
| aqueous dispersion resin | | | | |
| ethylene-vinyl acetate copolymer | | | | |
| S-753 | | 200 | 200 | |
| S-500 | | | | 91 |
| S-752 | | | | 100 |
| ethylene-vinyl acetate-vinyl versatate copolymer S-951 | 145 | | | |
| ethylene-vinyl acetate-acrylic ester copolymer S-910 | | | | |
| polyurethane | | | | |
| Adecabontiter HUX-380 | 53 | | | |
| Letan WB | | | | |
| aqueous dispersion resin solid content (parts by weight) | 100 | 100 | 100 | 100 |
| red phosphorus Nova Red-120 | | | 8 | |
| ammonium polyphosphate A | 60 | 80 | 80 | 80 |
| ammonium polyphosphate B | | | | |
| phosphoric ester TCP | | | | |
| phosphoric ester CDP | | | | |
| aluminum hydroxide C | | 120 | 120 | 120 |
| magnesium hydroxide D | 170 | | | |
| titanium oxide C-97 | 2 | 2 | 2 | 2 |
| water (balance) | 0 | 30 | 30 | 120 |
| viscosity of flame retarded aqueous dispersion | 3270 | 2520 | 2590 | 470 |

TABLE 7

|  |  | solid content % | Comparative Example 1 | Comparative Example 2 | Comparative Example 3 |
|---|---|---|---|---|---|
| fineness (De) of multi-filament fibers | | | 1750 | 1750 | 1750 |
| cloth | number of warps/10 cm | | 52 | 52 | 52 |
| | number of wefts/10 cm | | 52 | 52 | 52 |
| weight of cloth (g/m$^2$) | | | | | |
| weight of coated cloth (g/m$^2$) | | | | | |
| fineness (De) of coated yarn | | | 3940 | 4225 | 3837 |
| flame retardant for mesh sheets/ multi-filament fiber or cloth | | | 125/ 100 | 141/ 100 | 119/ 100 |
| combustion test | testing method | | A-2 | A-2 | A-2 |
| 1) | 2 minutes or 1 minute of heating | | | | |
| | carbonization area (cm$^2$) | | totally burnt | 7 | 26 |
| | afterflame time (seconds) | | | 0 | 14 |
| | afterglow time (seconds) | | | 0 | 18 |
| 2) | 6 seconds or 3 seconds after inflammation | | | | |
| | carbonization area (cm$^2$) | | totally burnt | 6 | totally burnt |
| | afterflame time (seconds) | | | 0 | |
| | afterglow time (seconds) | | | 0 | |
| 3) | number of times of flame contact | | | 5 | |
| color difference | whiteness DE | | 7.92 | 7.73 | 4.63 |
| | brightness DL | | −6.88 | −7.05 | −3.82 |
| generation of halogen gas (mg/g) | | | | 0 | |
| flexibility | | | ⊚ | X | ⊚ |
| tensile strength warp/weft (Kg/3 cm) | | | | 214/213 | |
| tensile elongation warp/weft (Kg/3 cm) | | | | 22/22 | |
| toughness warp/weft (Kg/mm) | | | | 9416 9372 | |
| drop impact strength (penetration test) m | | | | 6 | |

(Notes to Tables)
(1) Expressed in parts by weight based on 100 parts by weight of the resin solid content.
(2) The unit of values of the coated cloths of Examples 8, 9 and 10 is g/m².
(3) The finenesses and numbers of filaments of multifilament fibers for the cloths of Examples 8, 9 and 10 are 750 denier×3, 250 denier×1, and 250 denier×1, respectively.
(4) The combustion test of Examples 5, 7, 9 and 10 is based on A-1 method in which heating is carried out for 1 minute and fire is caught after 3 seconds.
(5) A is TERRAJU-60 (of Chisso Corporation).
(6) B is FOSTAPHRAM AP462 (of Client Japan Co., Ltd.).
(7) C is HIJILITE H-42M (of Showa Denko K.K.).
(8) KISMER 5A (of Kyowa Kagaku Co., Ltd.).
(9) The columns of the fineness (De) of the coated yarn and the coated cloth are for coated cloth in Examples 8, 9 and 10 and coated yarn in other examples.

Methods for Measuring Properties

1. Viscosity Measurement Method

BM type viscometer, rotor No. 6, revolution of 12 rpm, 25° C.

2. Combustion Test based on JIS L-1091

A-1 method (45° C., micro-burner method)

A-2 method (45° C., meckel burner method)

D method (number of times of flame contact)

3. Tensile Strength Test

Measured based on JIS L-1068

4. Analysis of Combustion Gas (1) Combustion Gas Generation Method

Tubular electric furnace method: based on JIS K 2541 combustion temperature: 850±10° C.

Amount of sample: 0.3 g

Air flow rate: 1,000 ml/min (2) Detection Method

Hydrogen chloride (HCl), hydrogen bromide (HBr), hydrogen fluoride (HF): detected by ion chromatography after treated based on JIS K 0107.

5. Drop Impact Strength (Penetration Test) Measured Based on JIS-8952 A steel tube having an outer diameter of 48.6 mm, a thickness of 2.5 mm and a weight of 2.7 kg was used in this test in the case of a flameproof mesh sheet for houses having a small number of stories and scattering prevention flameproof mesh sheet.

6. Flexibility

| | |
|---|---|
| Excellent (soft) | ⊚ |
| Good | ○ |
| Slightly good | D |
| Slightly bad | Δ |
| Bad | x |
| Sticky | xx |

7. Color Difference (1) Manufacturer: DATA COLOR INTERNATIONAL LTE (2) Type: SPECTRA FLASH SF-600

(3) Measurement method: DE (whiteness) and DL (brightness) of a sample piece are measured using a white substrate as a reference.

(4) Preparation of sample piece: After a flame retardant for mesh sheets is poured into a 10 cm wide, 15 cm long and 1 mm deep SUS frame, the flame retardant for mesh sheets above the top of the SUS frame is removed by a SUS bar, the other flame retardant is heated in a heating furnace at 150° C. for 5 minutes, and then the sample piece is taken out to prepare a sample piece.

The flameproof mesh sheet of the present invention is excellent in flame retardancy and satisfactory in terms of drop impact strength without generating harmful halogen gas at the time of combustion.

The Priority Documents Japanese Patent Application Nos. 10-199406 filed Jun. 4, 1998 and 11-130420 filed Apr. 2, 1999 are incorporated herein by reference in their entirety.

All documents and references referred to herein are specifically incorporated herein by reference in their entireties.

Use of singular terms such as "the," "an" and "a" can denote the singular or plural of the object that follows.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

We claim:

1. A flame retardant suitable for use in mesh sheets comprising:

a polyolefin resin aqueous dispersion having a resin solid content of 25–75 wt %, 40 to 130 parts by weight of an ammonium polyphosphate compound based on 100 parts by weight of said polyolefin resin aqueous dispersion, and 60 to 150 parts by weight of a metal hydroxide based on 100 parts by weight of the solid content of said polyolefin resin aqueous dispersion, wherein said flame retardant is prepared by:

blending an aqueous dispersion of an ethylene-vinyl acetate-acrylic ester copolymer of 5 to 30 wt % of ethylene, 10 to 75 wt % of vinyl acetate and 20 to 85 wt % of acrylic ester, having a resin solid content of 25 to 75 wt %, with a polyurethane aqueous dispersion having a solid content of 25 to 70 wt % in a solid content ratio of 90/10 to 30/70, and adding 40 to 130 parts by weight of the ammonium polyphosphate compound and 60 to 150 parts by weight of the metal hydroxide based on 100 parts by weight of the total resin solid content.

2. A flame retardant according to claim 1, wherein the polyolefin resin aqueous dispersion is at least one selected from (i) an aqueous dispersion of an ethylene-vinyl acetate copolymer of 10 to 95 wt % of vinyl acetate and the balance consisting of ethylene, having a resin solid content of 25 to 75 wt %, (ii) an aqueous dispersion of an ethylene-vinyl acetate-vinyl versatate copolymer of 5 to 30 wt % of ethylene, 15 to 70 wt % of vinyl acetate and 25 to 75 wt % of vinyl versatate, having a resin solid content of 30 to 70 wt %, and (iii) an aqueous dispersion of an ethylene-vinyl acetate-acrylic ester copolymer of 5 to 30 wt % of ethylene, 10 to 75 wt % of vinyl acetate and 20 to 85 wt % of acrylic ester, having a resin solid content of 25 to 75 wt %.

3. A flame retardant according to claim 1 or 2 which is prepared by:

blending an aqueous dispersion of an ethylene-vinyl acetate copolymer of 10 to 95 wt % of vinyl acetate and the balance consisting of ethylene, having a resin solid content of 25 to 75 wt %, with a polyurethane aqueous dispersion having a solid content of 25 to 70 wt % in a solid content ratio of 90/10 to 30/70, and adding 40 to 130 part by weight of the ammonium polyphosphate compound and 60 to 150 parts by weight of the metal hydroxide based on 100 parts by weight of the total resin solid content.

4. A flame retardant according to claim 1 or 2 which is prepared by:

blending an aqueous dispersion of an ethylene-vinyl acetate-vinyl versatate copolymer of 5 to 30 wt % of ethylene, 15 to 70 wt % of vinyl acetate and 25 to 75 wt % of vinyl versatate, having a resin solid content of 30 to 70 wt %, with a polyurethane aqueous dispersion having a solid content of 25 to 70 wt % in a solid content ratio of 90/10 to 30/70, and adding 40 to 130 parts by weight of the ammonium polyphosphate compound and 60 to 150 parts by weight of the metal hydroxide based on 100 parts by weight of the total resin solid content.

5. A flame retardant according to claim 1 or 2, wherein the ammonium polyphosphate compound is microcapsulated.

6. A flame retardant according to claim 1 or 2, wherein the metal hydroxide comprises magnesium hydroxide and/or aluminum hydroxide.

7. A flame retardant suitable for use in mesh sheets which is prepared by:

blending 3 to 30 parts by weight of an organic phosphoric ester with the flame retardant according to claim 1 or 2 based on 100 parts by weight of the solid content of an aqueous dispersion resin of the flame retardant.

8. A flame retardant for mesh sheets according to claim 7, wherein the organic phosphoric ester comprises a halogen-free phosphoric ester.

9. A flameproof mesh sheet woven of coated yarn prepared by:

coating multi-filament fibers with the flame retardant of claim 1 or 2 by impregnation and heating.

10. A flameproof mesh sheet according to claim 9, wherein the multi-filament fibers have an equivalent single fineness of 3 to 17 denier, a total fineness of 500 to 4,500 denier, a tensile strength of 4 to 10 g/denier and a breaking extension of 14 to 45%.

11. A flameproof mesh sheet prepared by coating mesh sheet cloth woven of multi-filament fibers with the flame retardant of claim 1 or 2 by impregnation and heating.

12. A flameproof mesh sheet according to claim 11, wherein the mesh sheet cloth woven of multi-filament fibers is prepared by:

plain weaving synthetic fibers having an equivalent single fineness of 2 to 13 denier, a total fineness of 150 to 2,500 denier, a tensile strength of 4 to 10 g/denier and a breaking extension of 14 to 45%, or by paralleling 2 to 4 fibers and leno weaving or imitation gauging said fibers with a loom, and wherein said mesh sheet cloth has a mesh length of 10 to 140 warps/10 cm and 10 to 140 wefts/10 cm.

13. A flameproof mesh sheet cloth woven of multi-filament fibers coated with 60 to 500 parts by weight of the flame retardant according to claim 1 or 2 by impregnation based on 100 parts by weight of the mesh sheet cloth woven of multi-filament fibers.

14. A flame retardant according to claim 1 or 2, further comprising 3 to 30 parts by weight of an organic phosphoric ester based on 100 parts by weight of the solids of said aqueous dispersion.

* * * * *